United States Patent
El Husseini et al.

(10) Patent No.: US 7,277,700 B2
(45) Date of Patent: Oct. 2, 2007

(54) SYSTEM AND METHOD FOR EMULATING A TELEPHONY DRIVER

(75) Inventors: Ahmad M. El Husseini, Redmond, WA (US); Shawn Kashyap, Bellevue, WA (US); David J. Hartley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/347,520

(22) Filed: Feb. 2, 2006

(65) Prior Publication Data

US 2006/0128369 A1 Jun. 15, 2006

Related U.S. Application Data

(63) Continuation of application No. 10/691,822, filed on Oct. 23, 2003, now Pat. No. 7,096,012.

(51) Int. Cl.
*H04Q 7/20* (2006.01)

(52) U.S. Cl. .................. 455/423; 455/418; 455/419; 455/420; 455/424; 455/425; 455/67.11; 455/115.1; 370/241.1; 370/248; 370/252; 379/9.01; 379/15.01; 379/15.03; 379/26.02; 379/27.04; 703/24; 703/28; 709/224; 709/250

(58) Field of Classification Search .............. 455/418, 455/419, 420, 423, 424–425, 67.11, 115.1; 370/241.1, 245, 252; 379/9.01, 15.01, 15.03, 379/26.02, 27.04; 703/24, 25; 709/224, 709/250

See application file for complete search history.

(56) References Cited

U.S. PATENT DOCUMENTS

| 5,504,800 | A | * | 4/1996 | Yehushua et al. | 379/27.01 |
| 5,539,803 | A | * | 7/1996 | Bhat et al. | 379/21 |
| 5,903,626 | A | * | 5/1999 | Iglehart et al. | 379/28 |
| 5,910,977 | A | * | 6/1999 | Torregrossa | 379/27.01 |
| 6,546,244 | B1 | * | 4/2003 | Yoder et al. | 455/425 |
| 6,587,671 | B1 | * | 7/2003 | Kanago et al. | 455/67.11 |
| 2002/0169591 | A1 | * | 11/2002 | Ryzl | 703/24 |
| 2004/0203467 | A1 | * | 10/2004 | Liu et al. | 455/67.14 |
| 2004/0205406 | A1 | * | 10/2004 | Kaliappan et al. | 714/31 |

* cited by examiner

*Primary Examiner*—Steve M. D'Agosta
(74) *Attorney, Agent, or Firm*—Merchant & Gould P.C.; Ryan T. Grace

(57) ABSTRACT

A system and method for emulating a telephone driver of a mobile device to assist in the development and testing of mobile telephony applications is described. An emulated telephony driver maintains internal states of a wireless network and characteristics of the mobile device. A wireless network is simulated such that neither a cellular radio nor a mobile subscription are required for handset application development and testing.

20 Claims, 7 Drawing Sheets

SYSTEM AND METHOD FOR EMULATING A TELEPHONY DRIVER

RELATED APPLICATIONS

This application is a continuation of application Ser. No. 10/691,822, filed Oct. 23, 2003 now U.S. Pat. No. 7,096,012, which application is incorporated herein by reference.

FIELD OF THE INVENTION

The present invention relates generally to computer software, and more particularly to software that emulates a telephony driver.

BACKGROUND OF THE INVENTION

Mobile computing devices, such as cellular telephones, have become commonplace in modern times. Telecommunications companies are constantly expanding the functionality of mobile devices. As a result, new applications to be used with cellular telephones are tested using wireless networks.

Cellular telephone application development and testing is typically performed with a computing device, such as a personal computer, coupled to a cellular radio. A radio interface layer (RIL) driver provides an interface between system software in the computing device and the cellular radio. The RIL receives requests from protocol layers in the computing device and then sends commands and data to the cellular radio. The cellular radio transmits signals to the wireless network to perform the function requested by the computing device, such as making a telephone call. The cellular radio then receives responses to the commands from the network. The RIL driver passes the received responses and data from the cellular radio back to the protocol layers. The RIL also notifies the computing device of changes in cellular radio status.

The RIL driver is difficult to test because the cellular radio is unreliable and unstable. The cellular radio often skews test results. Furthermore, the cellular radio commonly crashes during testing. Another problem that arises during testing involves the network itself. For example, a wireless network may become over-congested during testing such that inaccurate results may be produced.

SUMMARY OF THE INVENTION

The present invention is directed to a method and a system for emulating a telephony driver to test an application to be used in a mobile device. The method includes: sending a command from the application to an emulation telephony driver (ETD); translating the command to a network request; modeling a response to the network request; and sending the response.

The system includes an application layer, a cellular core, and the ETD. The application layer requests a telephony operation from the cellular core. The cellular core forwards a command associated with the request to the ETD. The ETD is configured to perform the following actions: receiving the command from the cellular core; translating the command to a network request; modeling a response to the network request; and returning the modeled response to the cellular core and application layer. The modeled response indicates whether the network request was successful plus any other expected information.

DETAILED DESCRIPTION OF THE PREFERRED EMBODIMENT

Briefly stated, the present invention is directed at a system and method for emulating a telephone driver of a mobile device to assist in the development and testing of mobile telephony applications. An emulated telephony driver maintains internal states of a wireless network and characteristics of the mobile device. A wireless network is simulated such that neither a cellular radio nor a mobile subscription are required for application development and testing. These and other aspects of the invention will become apparent to those skilled in the art after reading the following detailed description.

Illustrative Handset

Figure 3:
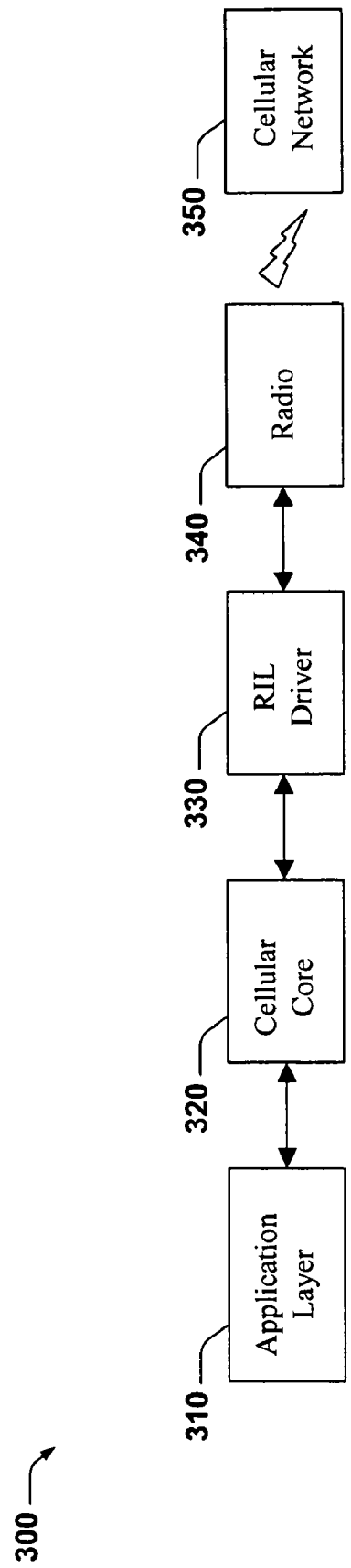
FIG. 3 illustrates a functional block diagram of a standard system for implementing a mobile device.

FIG. 3 illustrates a functional block diagram of a standard system for implementing a mobile device. The mobile device 300 includes an application layer 310, a cellular core 320, a radio interface layer (RIL) driver 330, a radio 340 and a cellular network 350. The application layer 310 is coupled to the cellular core 320. The cellular core 320 is coupled to the RIL driver 330. The RIL driver 330 is coupled to the radio 340. The radio 340 is coupled to the cellular network 350.

The cellular core 320 contains the code associated with operating the mobile device 300. For example, the cellular core 320 can include the operating system 264 and storage 268 shown in FIG. 2, or any other cellular component existing between the applications 266 and the radio interface layer 272. The cellular core 320 is a commonly tested area of the mobile device 300.

Telephony applications are stored in the application layer 310. The cellular core 320 receives a request associated with an application from the application layer 310 and converts the request to commands that are forwarded to the radio 340. The radio 340 transmits the commands to the cellular network 350. The cellular network 350 then performs the requested function and returns a response to the radio 340. The cellular core 320 receives responses to the commands from the radio, and then forwards the responses to the application layer 310 in a readable format.

Illustrative Emulated Telephony Driver

Figure 4:
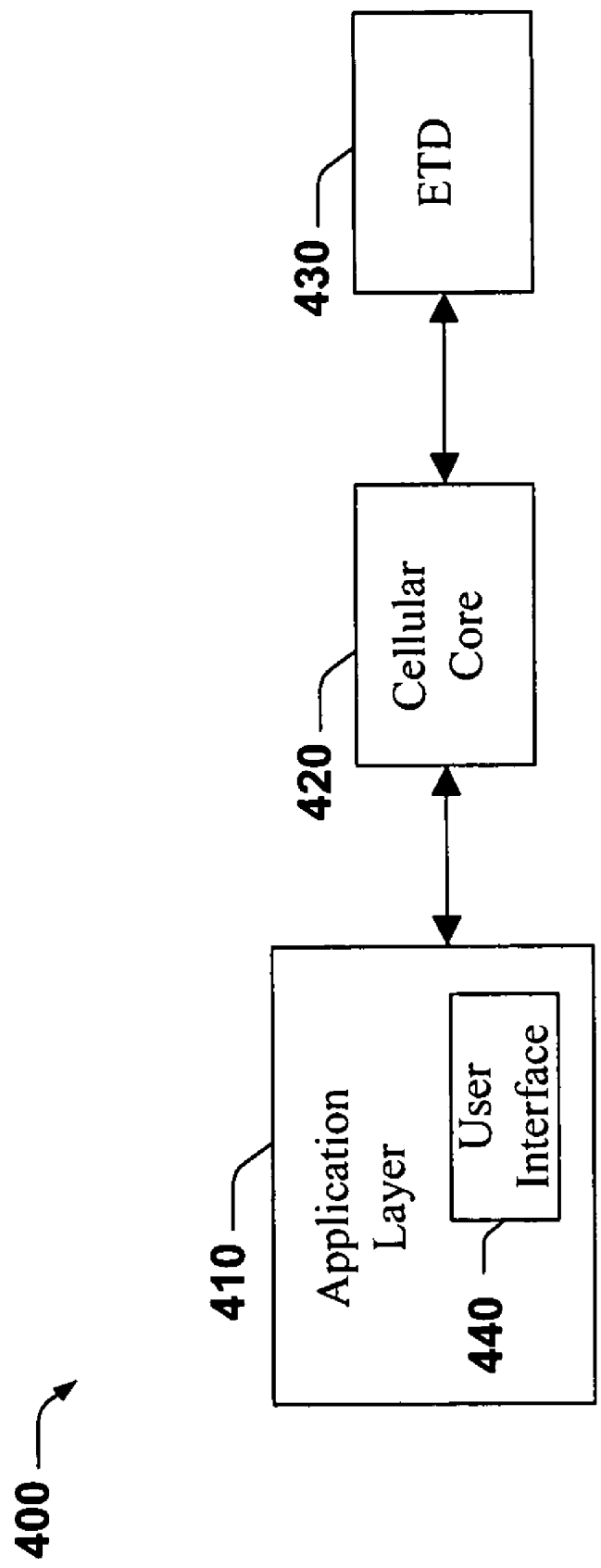
FIG. 4 illustrates a functional block diagram of a mobile device including an emulated telephony driver (ETD).

FIG. 4 is a functional block diagram of a mobile device including an application layer 410, a cellular core 420, and an emulated telephony driver (ETD) 430, in accordance with the present invention. The cellular core 420 is coupled between the application layer 410 and the ETD 430. The ETD 430 is substituted for the RIL driver 330, the radio 340, and the cellular network 350 of the mobile device 300 shown in FIG. 3. The cellular core 420 cannot detect that the RIL driver 330 has been substituted with the ETD 430. From the standpoint of the cellular core 420, it appears that a non-simulated network is present because the ETD 430 maintains the internal state of the network.

The ETD 430 has a standard interface to interact with the cellular core 420. The ETD 430 receives commands from the cellular core 420 and the application layer 410 and translates the commands into network requests. The ETD 430 models execution of the request and a response is returned to the cellular core 420 and the application layer 410. An application developer can observe the response through a user interface 440 at the application layer 410. The response that is returned is the response expected from a normal operating cellular environment. Each time the ETD 430 receives a request, the ETD 430 executes the request based on the state of the network.

The ETD 430 simulates the network by maintaining the state of the network. The ETD 430 simulates features supported by the applications on the cellular core 420. The ETD 430 tests that an application is properly implemented by determining that the network settings are correct and that subsequent responses are properly handled. The ETD 430 can also test applications that have not yet been implemented on base station hardware. For example, a call barring feature, which prevents a user from placing a class of outgoing calls, could only be tested previously by using an expensive test set.

Figure 5:
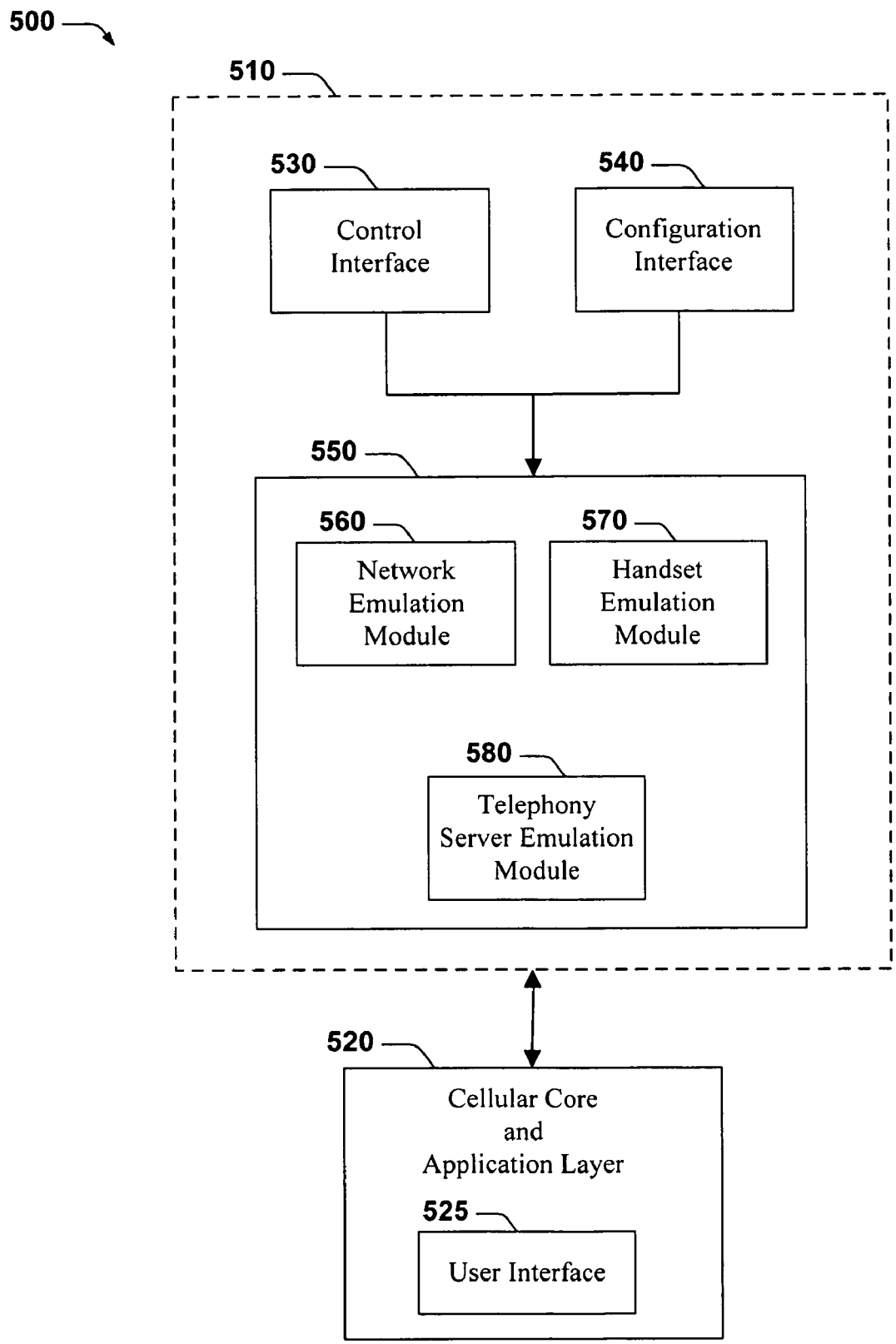
FIG. 5 illustrates a functional block diagram of a mobile device including the basic architecture of the ETD coupled to a cellular core and an application layer of the mobile device.

FIG. 5 illustrates a functional block diagram of a mobile device 500 including an ETD 510 coupled to a cellular core/application layer 520, in accordance with the present invention. The cellular core/application layer 520 includes a user interface 525. The ETD 510 includes a control interface 530, a configuration interface, 540 and an emulation core 550. The control interface 530 and the configuration interface 540 are coupled to the emulation core 550. The emulation core 550 is coupled to the cellular core/application layer 520. The emulation core 550 includes a network emulation module 560, a handset emulation module 570, and a telephony server emulation module 580.

The network emulation module 560 includes information about the state of the network. The network emulation module 560 can be used to simulate network problems and network configurations. For example, the network emulation module 560 can be used to simulate network congestion. The network emulation module 560 can also be used to replicate a specific network configuration such as the T-Mobile wireless network.

The handset emulation module 570 stores information that is usually saved in the handset of a mobile device. For example, the handset emulation module 570 can be used for saving phone book entries and authorizing user access to the network. The handset emulation module 570 can simulate the function of a cellular radio such that any features that the user has subscribed to are also included in the handset emulation module 570. For example, the handset emulation module 570 can include features related to call barring and call forwarding.

The telephony server emulation module 580 emulates the actual dialing of a phone call. In one embodiment, the telephony server emulation module 580 includes modems that allow an application developer to dial to and receive return calls from another phone number. The telephony server emulation module 580 can execute certain dialing commands such as a call back command. The call back command tests the receipt and answer of a phone call. The call back command can also test a data connection. Data is transmitted to the telephony server emulation module 580, which then returns the same data such that proper data transfer can be verified. Instead of transmitting data to a real server and receiving a response, the telephony server emulation module 580 returns the anticipated response.

The control interface 530 is used to notify the system of status changes in the network. The application developer can use the control interface 530 to configure the network to any state such that any network feature or application can be emulated. For example, the application developer can use the control interface 530 to enable the network emulation module 560 for receiving a phone call. Other features that can be enabled through the control interface 530 include forwarding a phone call, receiving text messages, replicating network congestion, and varying signal strength.

The control interface 530 allows the application developer to manipulate variables associated with the emulation core 550. The control interface 530 also allows the application developer to perform testing using network fault injection. This is useful because some tests cannot be performed using a real network. For example, the control interface 530 can be used to simulate the transmission of invalid text messages.

Application error handling is another example of a network feature that cannot be tested over a non-simulated network but can be tested using the ETD 510. The application developer uses the control interface 530 to arrange for the generation and delivery of an error message when an application fails. For example, the ETD 510 can be configured to send a network congestion error after continuous attempts to complete a telephone call fail. The success of an application can be determined by checking if the corresponding error was sent to the user interface 525.

The application developer can use the configuration interface 540 to configure the state of the network by specifying which features the network supports. For example, the configuration interface 540 can be used to configure call barring, phone book entries, a phone number associated with a mobile device, radio settings and network settings. The settings associated with different networks can be saved in configuration files such that each unique network setting has a corresponding configuration file.

Illustrative Process of Emulating a Telephony Driver

Figure 6:
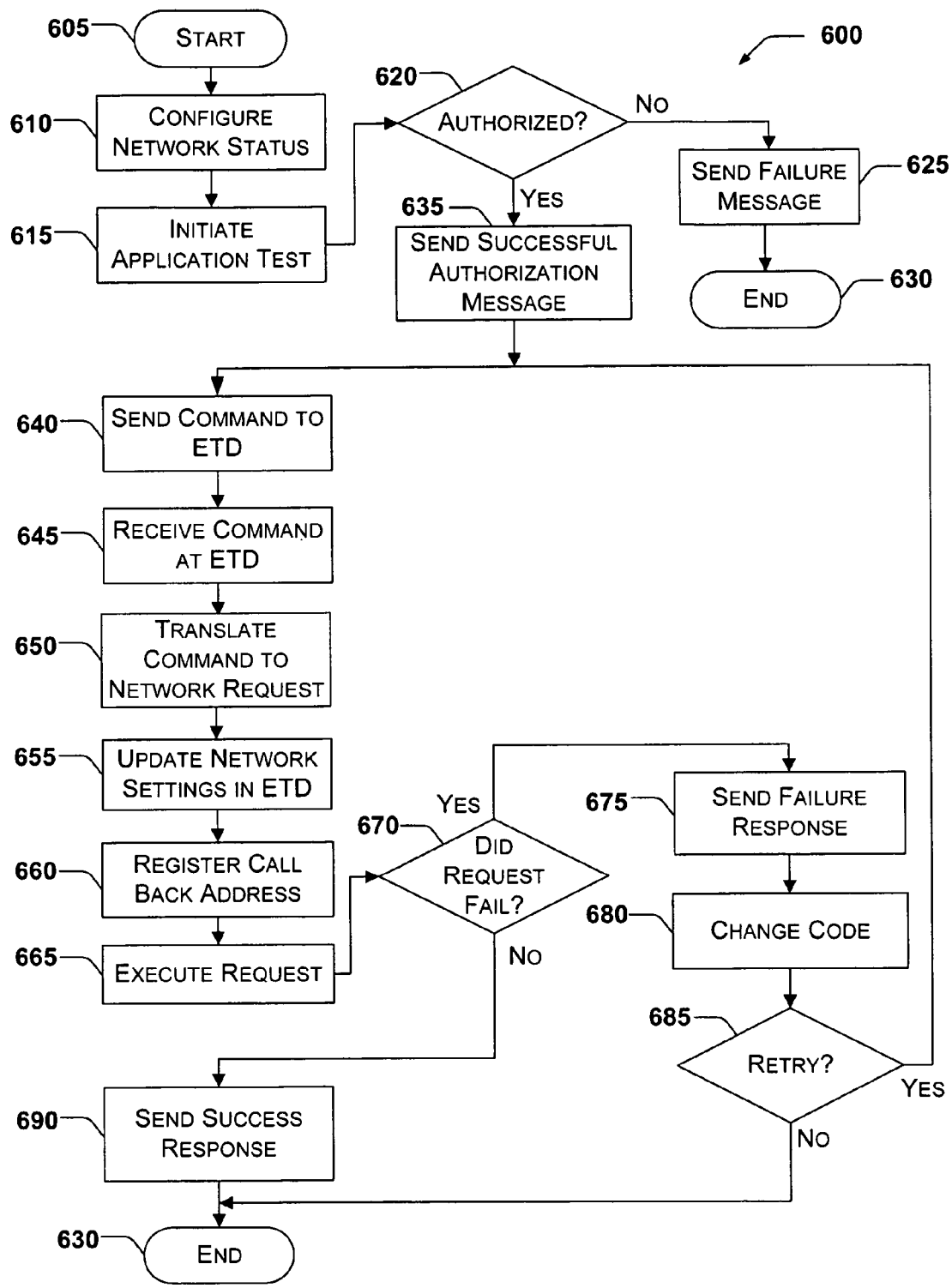
FIG. 6 is a logical flow diagram of a process for emulating a telephony driver.

FIG. 6 is a logical flow diagram of an exemplary process for emulating a telephony driver according to the present invention. The process 600 begins at start block 605 and continues to block 610 where the application developer configures the network status using the control interface and the configuration interface. The network status in configured by specifying the features supported by the network. At block 615, the application developer initiates the application test by accessing the control interface to send a command to the emulation core. The process then proceeds to decision block 620.

At decision block 620, a determination is made whether the application developer is authorized. According to one embodiment, the application developer is prompted for proper authentication before the command is sent to the emulation core. For example, the emulation core can prompt the user to enter a personal identification number (PIN). If a determination is made that the application developer is not authorized to change the status of the network, then the process proceeds to block 625 where a failure message is sent to the user interface. The process then terminates at end block 630. Alternatively, if a determination is made that the application developer is authorized to change the status of the network, the process advances to block 635 where a successful authorization message is sent to the user interface. The process continues at block 640.

At block 640, the command is sent from the application layer to the emulation core. The emulation core receives the command at block 645. At block 650, the emulation core translates the command to a network request. The network settings are updated in the appropriate module of the emulation core based on the network request at block 655, such that the application to be tested is implemented in the emulation core. At block 660, a call back address associated with the network request is registered with the emulation core. In one embodiment, the call back address corresponds to the user interface in the application layer. The emulation core then executes the network request at block 665.

At decision block 670, a determination is made whether the request failed. If a determination is made that the request failed, the process advances to block 675, where a failure response is forwarded to the registered call back address. A failure response indicates that correct settings were not implemented in the emulation core. In one embodiment, a dialog box appears at the user interface indicating application failure. The dialog box can be customized to indicate the type of failure that has occurred. At block 680, the application developer can attempt to correct the failure by changing software code associated with the application. The application developer is then prompted to re-execute the application by selecting a retry function in the dialog box at decision block 685. If the application developer wants to re-execute the application, the process returns to block 640 where another command is sent to the emulation core. If the application developer does not wish to re-execute the application, the process terminates at end block 630.

Returning to decision block 670, if a determination is made that the request succeeded, the process advances to block 690, where a success response is forwarded to the registered call back address. The process then terminates at end block 630.

Figure 7:
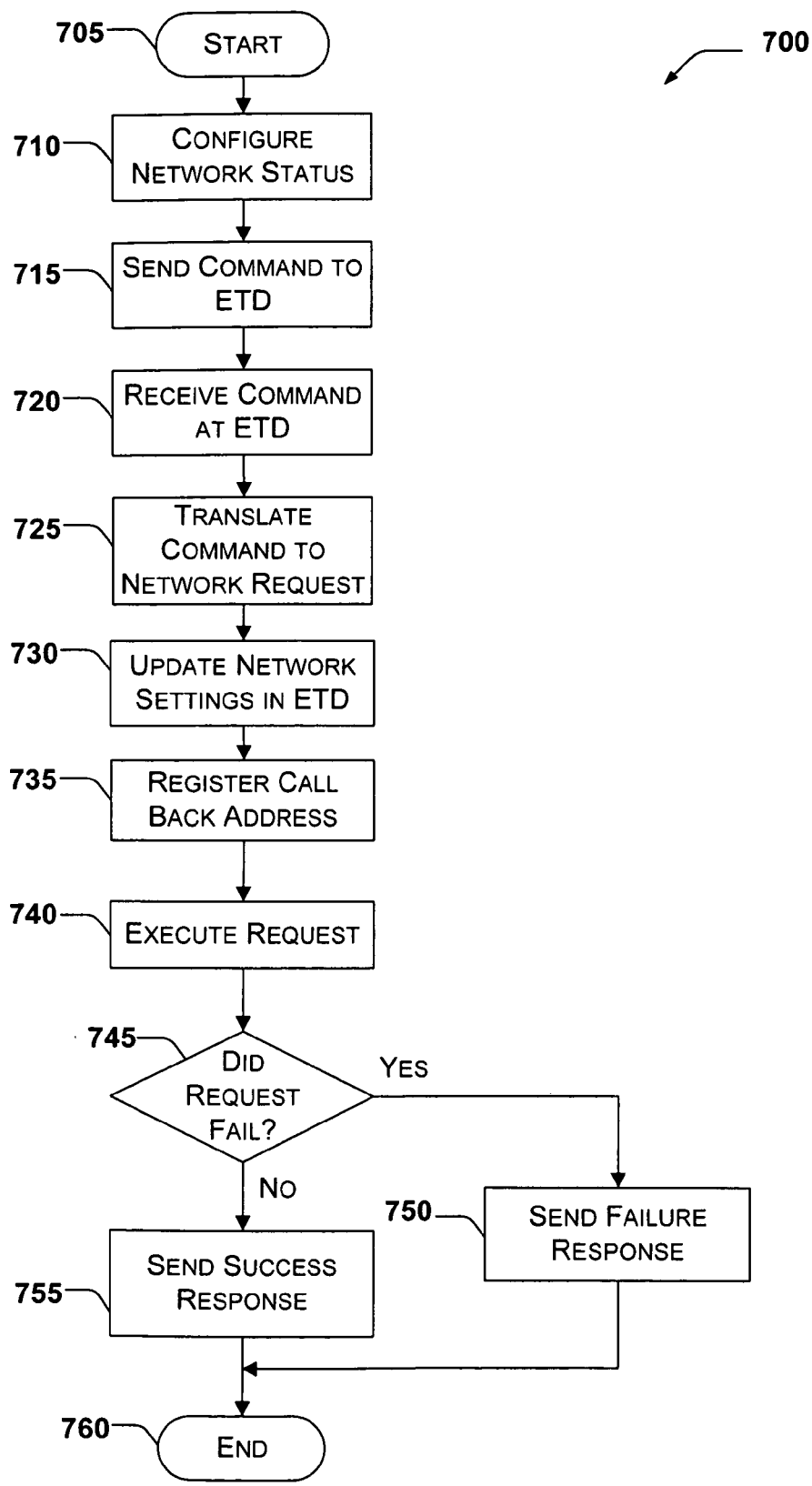
FIG. 7 is a logical flow diagram of a process for testing a call barring function.

FIG. 7 is a logical flow diagram of an exemplary process for emulating a telephony driver for testing a call barring application according to the present invention. Call barring prevents a user from dialing a certain class of numbers. For example, the call barring application can prevent international phone calls from being completed. Previously, the application developer had to attempt to make an international call using a cellular radio to determine if the call barring application was properly implemented on the network.

The process 700 begins at start block 705 and continues to block 710 where the authorized application developer configures the network status to accommodate the call barring application using the control interface and the configuration interface. At block 715, the application developer initiates the call barring application test by accessing the control interface to send a call barring command from the application layer to the emulation core. The emulation core receives the call barring command at block 720. At block 725, the emulation core translates the call barring command to a network request. The network settings are updated in the telephony server emulation module to prevent outgoing calls to the class of barred numbers at block 730.

At block 735, a call back address associated with a phone dialing application request is registered with the emulation core. According to one embodiment, the call back address corresponds to the user interface. The emulation core then executes the phone dialing application request such that a barred number is dialed at block 740.

At decision block 745, a determination is made whether a connection has been made to the dialed number. If a determination is made that a connection was made to the dialed number, then the process advances to block 750, where a failure response is forwarded to the user interface. The failure response can be a message that the call to the barred number has connected. The failure response indicates that the call barring settings were not properly implemented in the telephony server emulation core. If the application developer does not wish to change the software code associated with the call barring application or re-execute the application, the process terminates at end block 760.

Alternatively, if a determination is made that a connection was not made to the dialed number, the process advances to block 755, where a success response is forwarded to the user interface. The success response can be a message that the call to the barred number is not allowed. The success response informs the application developer that the call barring application was properly implemented because the ETD prevented connection to the barred phone number. The process then terminates at end block 760.

In another embodiment, the ETD can test if the user is properly notified when she is beyond network range. The application developer uses the control interface to execute an application that simulates the handset moving beyond network range, i.e., the network is deactivated. If the test is successful, the user is notified that she is no longer registered to the network. Thus, if the user attempts to call a number that is a part of the network, an error message is generated and sent to the user. Previously, such a feature was tested by actually taking the mobile device outside the range of the network. For example, the tester would drive to a remote area inaccessible to the network.

The ETD can also test if the mobile device properly switches from digital to analog when the mobile device is outside the range supported by a digital network, i.e., the mobile device is roaming. The ETD executes a roaming application and a phone dialing application. A message appears at the user interface that the network has switched to analog if the roaming application is properly implemented and functioning accurately. In one embodiment, a dialog box appears at the user interface indicating that the user is roaming.

The ETD can emulate any network feature. For example, the ETD can emulate voice mail characteristics, cellular broadcasts, and text messaging features. Some text messaging features cannot be tested on a real network because the network interprets such text messages as spam and the network is disabled. The ETD also provides the convenience of not having to connect with certain callers for public policy reasons. For example, emergency calls to 911 could not be previously tested without actually calling the emergency operator.

Illustrative Operating Environment

Figure 1:
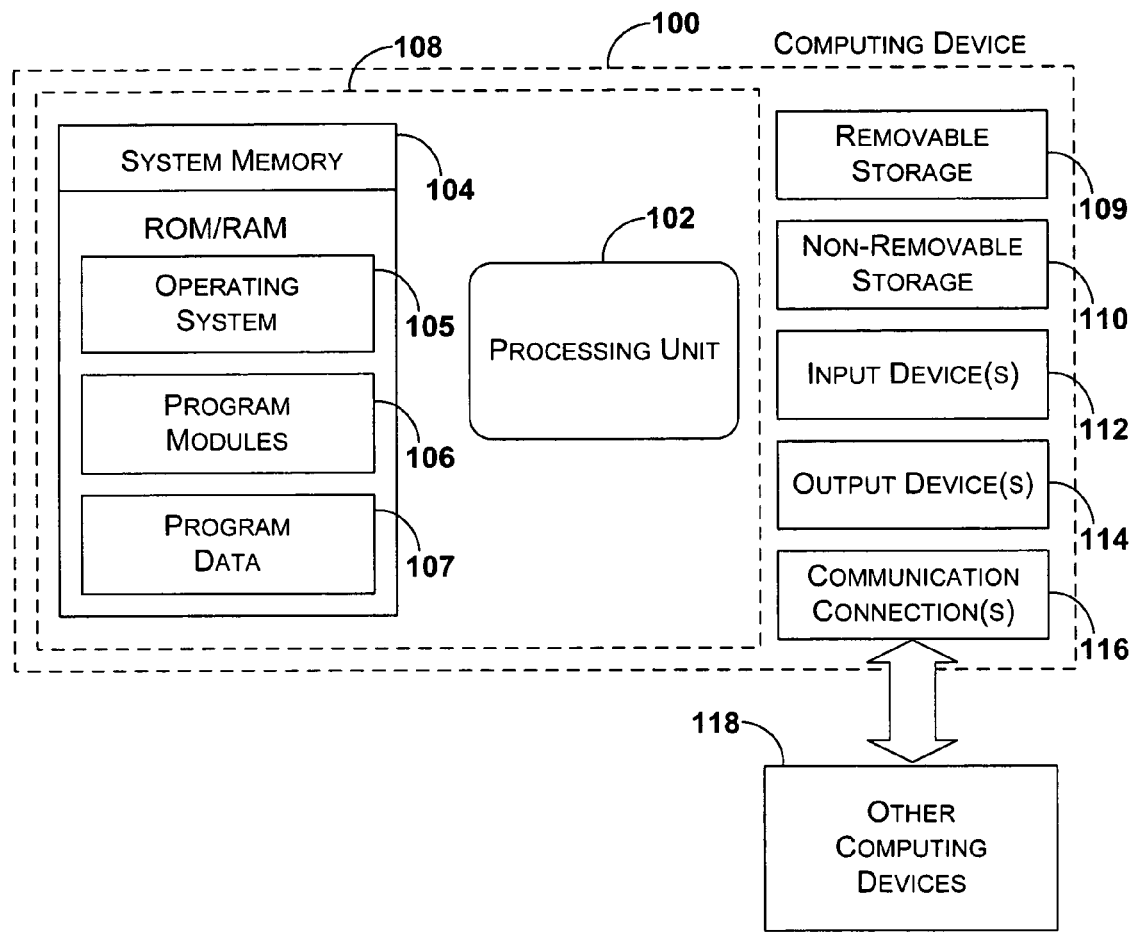
FIG. 1 illustrates an exemplary computing device that may be used in one exemplary embodiment of the present invention.

With reference to FIG. 1, an exemplary computing device that may be used in one exemplary embodiment of the present invention is illustrated. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
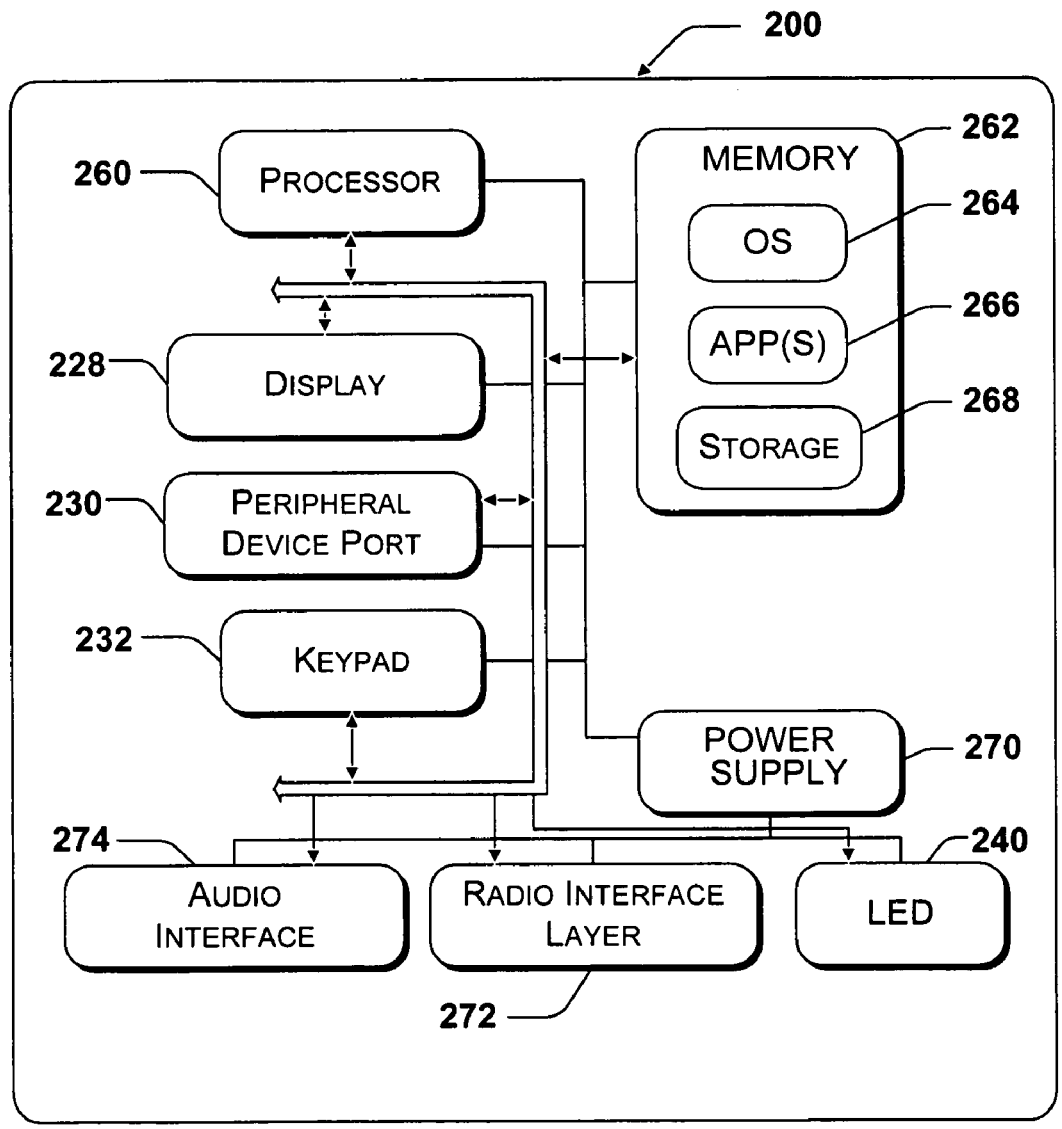
FIG. 2 illustrates an exemplary mobile device that may be used in one exemplary embodiment of the present invention.

With reference to FIG. 2, an exemplary mobile device that may be used in another exemplary embodiment of the present invention is illustrated. The mobile device 200 includes a processor 260, a memory 262, a display 228, peripheral device port 230, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include phone dialer programs, installation wizard programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer executable instructions for emulating a telephony driver to test an application to be used in a mobile device, comprising:
   sending a command from the application to an emulation telephony driver (ETD);
   translating the command to a network request;
   registering a call back address for the application associated with the network request in the ETD;
   modeling a response to the network request;
   sending a failure response to the registered call back address of the application when the network request is not successful; changing software code associated with the application when the network request is not successful, wherein the software code is changed based on the response; and sending a success response to the registered call back address for the application when the network request is successful, wherein the success response indicates that the network request was successful.

2. The computer-readable storage medium of claim 1, further comprising configuring the ETD such that the ETD simulates features supported by a wireless network.

3. The computer-readable storage medium of claim 1, further comprising updating at least one network setting in the ETD based on the network request such that the application to be tested is implemented in the ETD.

4. The computer-readable storage medium of claim 1, further comprising preventing unauthorized testing.

5. The computer-readable storage medium of claim 1, wherein the call back address corresponds to a user interface of the application.

6. The computer-readable storage medium of claim 1, wherein the application is a call barring application that prevents a class of telephone numbers.

7. A system for emulating a telephony driver to test an application to be used in a mobile device, comprising:
 means for sending a command from the application to an emulation telephony driver (ETD);
 means for translating the command to a network request;
 means for registering a call back address for the application associated with the network request in the ETD;
 means for modeling a response to the network request;
 means for sending the response;
 means for changing software code associated with the application when the network request is not successful, wherein the software code is changed based on the response; means for re-executing the network request after changing the software code associated with the application; and
 means for sending a success response to the registered call back address for the application when the network request is successful, wherein the success response indicates that the network request was successful.

8. The system of claim 7, further comprising means for configuring the ETD such that the ETD simulates features supported by a wireless network.

9. The system of claim 7, further comprising means for updating at least one network setting in the ETD based on the network request such that the application to be tested is implemented in the ETD.

10. The system of claim 7, further comprising means for preventing unauthorized testing.

11. The system of claim 7, wherein the call back address corresponds to a user interface of the application.

12. The system of claim 7, wherein the application is a call barring application that prevents a class of telephone numbers.

13. A method for emulating a telephony driver to test an application to be used in a mobile device, comprising:
 sending a command from the application to an emulation telephony driver (ETD);
 translating the command to a network request;
 registering a call back address for the application associated with the network request in the ETD;
 modeling a response to the network request;
 sending a failure response to the registered call back address of the application when the network request is not successful; changing software code associated with the application when the network request is not successful, wherein the software code is changed based on the response; and
 sending a success response to the registered call back address for the application when the network request is successful, wherein the success response indicates that the network request was successful.

14. The method of claim 13, further comprising configuring the ETD such that the ETD simulates features supported by a wireless network.

15. The method of claim 13, further comprising updating at least one network setting in the ETD based on the network request such that the application to be tested is implemented in the ETD.

16. The method of claim 13, further comprising preventing unauthorized testing.

17. The method of claim 13, further comprising re-executing the network request after changing the software code associated with the application.

18. The method of claim 13, wherein the call back address corresponds to a user interface of the application.

19. The method of claim 13, wherein the application is a call barring application that prevents a class of telephone numbers.

20. The method of claim 13, wherein the failure response includes a dialog box that indicates a type of failure.

* * * * *